United States Patent [19]

Boucher

[11] 4,438,970
[45] Mar. 27, 1984

[54] VEHICLE CAB SUSPENSION

[75] Inventor: Graeme B. Boucher, Ferntree Gully, Australia

[73] Assignee: Paccar Inc., Bellevue, Wash.

[21] Appl. No.: 288,983

[22] Filed: Jul. 31, 1981

[30] Foreign Application Priority Data

Oct. 9, 1980 [AU] Australia .................. PB5973

[51] Int. Cl.³ .................................. B62D 27/06
[52] U.S. Cl. ........................ 296/190; 180/89.14; 296/35.1
[58] Field of Search ............... 296/190, 35.1; 180/89.13, 89.14, 89.15, 89.16

[56] References Cited

U.S. PATENT DOCUMENTS

| 2,485,794 | 10/1849 | Waterbury | 296/35.1 |
| 2,708,133 | 5/1955 | Sewelin | 296/35.1 |
| 3,129,973 | 4/1964 | Maruhn | 296/35.1 |
| 3,802,956 | 5/1975 | Plegat | 296/35.1 |
| 4,203,499 | 5/1980 | Miyata | 296/35.1 |
| 4,253,700 | 3/1981 | Di Francescantonio | 296/190 |
| 4,330,149 | 5/1982 | Salmon | 296/190 |

*Primary Examiner*—Bruce H. Stoner, Jr.
*Assistant Examiner*—John A. Carroll
*Attorney, Agent, or Firm*—Seed and Berry

[57] ABSTRACT

A cab suspension for a vehicle having a chassis supporting the cab, the cab being pivotally attached to the chassis at forward first and second spaced-apart, transversely aligned locations, and a rearward third attachment including a lever coupled to one of the cab and chassis at a first position along the lever and to the other of said cab and chassis at a second position along the lever. A spring and hydraulic damper act between the lever and the chassis to apply through the lever resilient force directed against the weight of cab, whereby the cab can oscillate vertically about a forward transverse axis and be rearwardly resiliently supported by said lever. In one embodiment, the spring and hydraulic damper are a pressurized cylinder for adjusting the height of the cab.

23 Claims, 9 Drawing Figures

VEHICLE CAB SUSPENSION

This invention relates to vehicle cab suspensions.

According to the invention there is provided a vehicle having a chassis and a cab, said cab being supported on the chassis at first, second and third spaced apart locations, said first and second locations being generally aligned in the side to side direction of the vehicle and spaced apart in the side to side direction and said third location being spaced away from the first and second locations in the lengthwise direction of the vehicle; the cab being mounted to the chassis at the first and second locations by means permitting movement of the cab relative to the chassis, but confining such movement at least substantially to movement about a side to side extending axis adjacent said first and second locations; the cab being mounted to the chassis at the third location by means of a lever coupled to one of said cab and chassis at a first position along the lever and to the other of said cab and chassis at a second position along the lever; resilient means being provided acting between a first of said cab and chassis and said lever at a third position along the length of said lever such as to apply through the lever resilient force directed against the weight of cab; said second position being between said first and third positions. Normally, the said resilient means interconnects the lever and that of said cab and chassis to which the lever is coupled at its first position. That is to say, normally the aforementioned said one of said cab and chassis comprises the aformentioned said first and said cab and chassis. Normally too, the lever is coupled to the cab at said second position, whilst said chassis is coupled to said lever at said first position, said resilient means being in the form of a compression spring acting between the chassis and the lever at said third position.

Preferably, said lever extends generally transversely of the chassis, the couplings to said first and second positions thereof being pivotal couplings with the axes of pivotal movement between the link and cab and chassis at the first and second positions being arranged to extend generally lengthwise of the vehicle. The said resilient means is preferably of the kind including a gas chamber the pressure of gas within which can be varied to adjust the length of the resilient means when under a given load. In use, the gas pressure is adjusted so that, taking into account any variation of the height of the chassis over the lengthwise distance between the third location and the common lengthwise position of the first and second locations, the cab is brought to about a level position. Up and down oscillatory movements of the cab occurring as the vehicle is driven are dampened by the resilient means, thus improving the ride.

If desired, means may be provided sensitive to the degree of levelness of the cab and operable to influence admission and removal of gas to and from said resilient means in order to maintain the cab level. The resilient means may comprise a spring and damper unit of known type.

The invention is further described with reference to the accompanying drawings in which.

Figure 1:
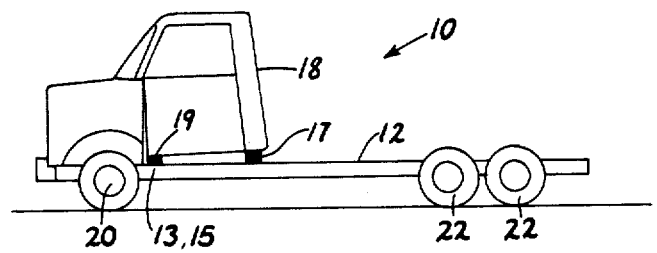
FIG. 1 is a diagrammatic side view of a vehicle constructed in accordance with the invention.
Figure 2:
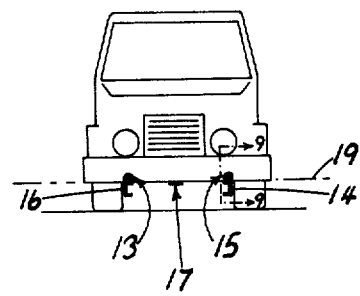
FIG. 2 is a diagrammatic front view of the vehicle of FIG. 1.

The drawings show a vehicle 10 having a chassis 12. Chassis 12 comprises lengthwise extending side by side beams 14, 16. The chassis is constructed in usual fashion, carrying a cab 18 within which thhe driver sits, the cab having the usual steering and other vehicle controls. The chassis also provides suitable supports for forward and rear ground wheels 20, 22.

Figure 9:
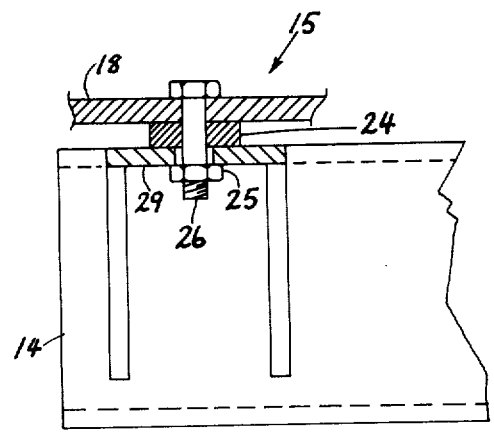
FIG. 9 is a diagrammatic enlarged cross-section on the line 9—9 in FIG. 2.

At its front, cab 18 is mounted to chassis 12 by mountings 13, 15 at first and second locations which are positioned in side to side alignment. The form of these mountings is not important to the present invention, save that they should provide a means for allowing pivotal movement of the cab generally about a side to side axis at the front part of the cab. In the present instance, the mountings each are shown (FIG. 9) in the form of annular rubber elements 24 positioned between the cab and chassis and each having a bolt 26 extending downwardly through aligned openings in the cab, element 24 and chassis 12. The bolts 26 have nuts 25 thereon to the underside of mounting plates 29 of the chassis and on which plates the elements 24 rest. The nuts are tightened up to somewhat compress the elements 24. The elements 24 of the two mountings 13, 15 provide resilient mounting of the front part of the cab at the locations of the two mountings, permitting limited universal movement between the cab and chassis and, more particularly, permitting pivotal movement of cab 18 about a forward side-to-side axis 19 passing through the mountings 13, 15.

At the rear, cab 18 has a mounting 17 coupled to the chassis at only a single location. This location is spaced rearwardly from the common lengthwise position of the mountings 13, 15. The mounting 17 includes a lever 40. Lever 40 extends generally transversely of the vehicle and is pivotally mounted at one end to beam 16 of the chassis, this being effected by means of a pivot pin 42 which extends in the front to rear direction of the vehicle and passes through apertures in two plates 44, 46 fixed to beam 16 and through a corresponding aperture in one end of lever 40, the lever end being positioned between the plates 44, 46. At a position intermediate the ends of the lever 40, the lever is coupled to the cab by means of a bracket 48 fixed to the underside of the rear of the cab and having a generally U-shaped form so as to define front and rear downwardly extending flanges 50, 52 between which the lever 40 extends. A pivot pin 54 extends in the forward to rear direction through aligned apertures in the flanges 50, 52 and in the lever 40. From the position of pin 54, the lever 40. extends to the opposite side of the chassis from beam 16 and is there interconnected with chassis beam 14 by means of a spring and damper unit 56. Spring and damper unit 56 is of conventional form including a hydraulic damper and a pneumatic spring. It has two casing parts 56a, 56b mounted for telescoping sliding movement and has a pneumatic spring such as in the form of an air bag, positioned between there so that inward sliding movement of the casing parts 56a, 56b, one within the other, is resisted by increase in gas pressure within the bag as such inward sliding towards each other occurs. The unit also incorporates a hydraulic damping mechanism operating in the normal fashion of a vehicle shock absorber. Casing part 56b at its lower end is interconnected with beam 14 by a pivot pin 58 which extends in the front to rear direction through aligned openings in two plates 60, 62 affixed to beam 14 and through an aperture in casing part 56b. Plates 60, 62 are positioned to front and rear sides of the casing part 56b. The upper end of casing part 56a is mounted to the lever 40 in conventional manner, such as by means of a threaded shank 66 which extends from the remainder of the casing part through an aperture in the lever 40 and which has a resilient support therearound where this passes through the lever aperture, the resilient support being shown diagrammatically by reference numeral 68 in the drawings. A nut 70 is provided on shank 66 and screwed down to hold the casing part 56a in position. The support 68 permits a limited degree of universal movement of the upper end of the unit 56 relative to the lever 40.

Figure 3:
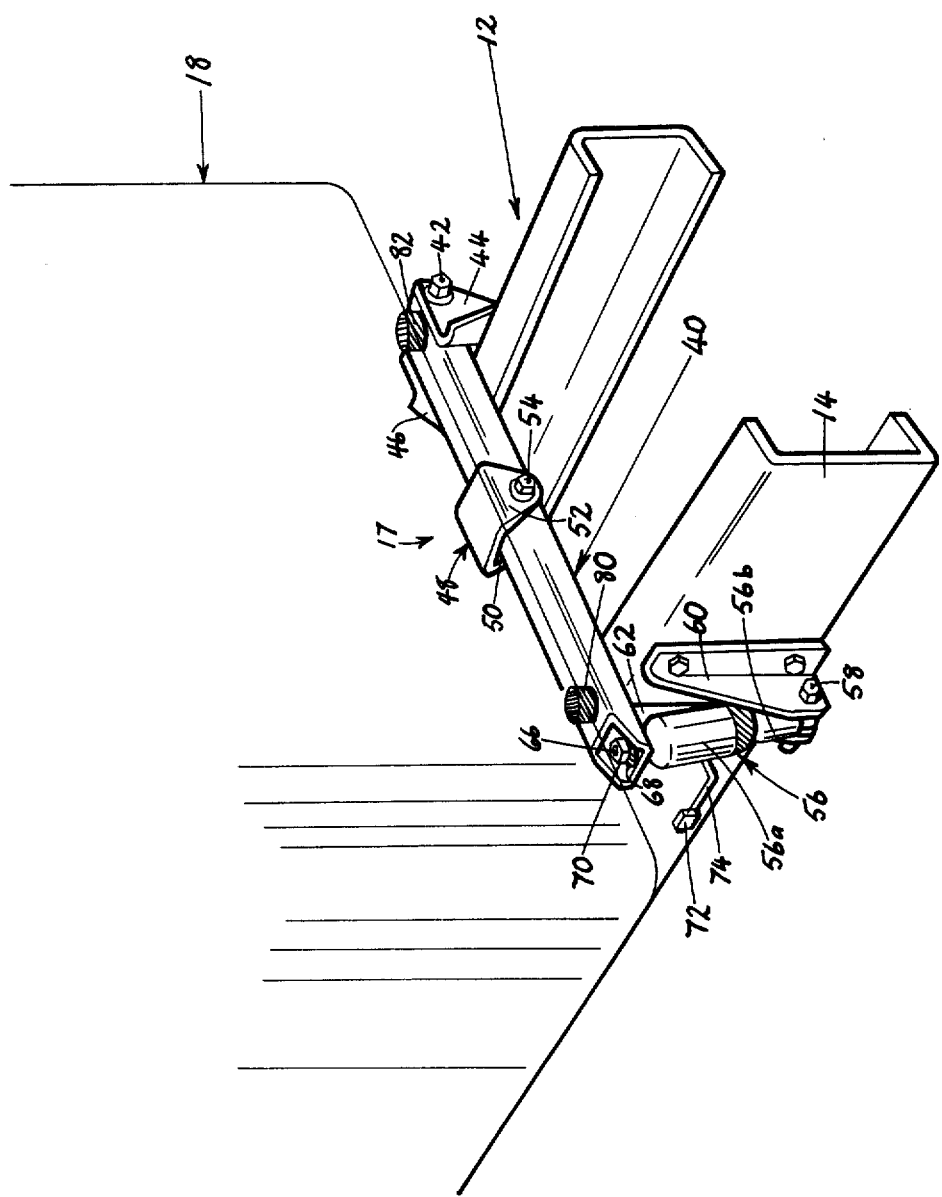
FIG. 3 is a diagrammatic perspective view showing the mounting at the rear of a cab incorporated into the vehicle of FIG. 1.
Figure 4:
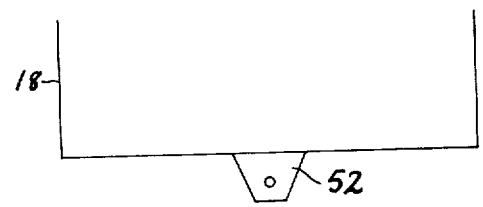
FIG. 4 is a diagrammatic end view of the mounting of FIG. 3.
Figure 4:
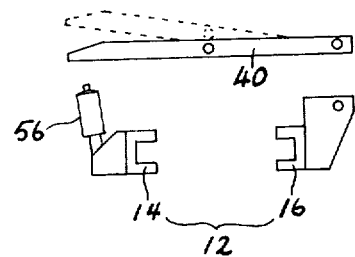
Figure 5:
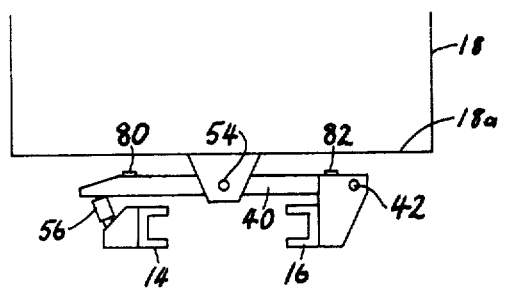
FIGS. 5, 6, 7 and 8 are diagrams illustrating conditions of the rear cab mounting under various loading conditions.
Figure 6:
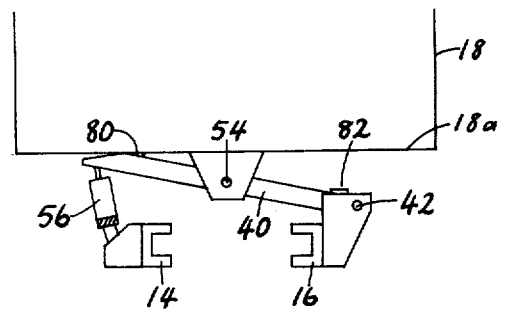

In normal operation, the lever 40 is arranged at a position such that the lever 40 is roughly horizontal and under this condition, the floor 18a of cab 18 is also roughly horizontal. Movement of the lever 40 to bring about levelling is effected by varying the pressure within the gas bag of unit 56 in conventional fashion. For example, FIG. 3 shows a "Schrader" valve 72 interconnected by a pipeline 74 to the unit 56 so as to provide access to the interior of the gas bag therewithin. By operating this valve manually to expel air from the gas bag in the unit, the end of the lever adjacent the unit 56 can be moved downwardly to pivot the lever about the axis of pin 42. Similarly, by application of a high pressure source of air to the valve 72, the gas volume within the gas bag of the unit can be increased to raise the end of the lever adjacent unit 56 and induce oppositely directed pivotal movement around the axis of pin 42. During travel of vehicle 10, up and down oscillatory movement of the chassis will occur and this movement is to some extent transmitted to the cab 18 via mountings 13, 15 and 17. However, the movement is relatively dampened by the action of the unit 56 acting as a conventional shock absorber, relative movement between parts 56a, 56b of the unit being induced by pivoting of the lever 40 when a variation in height of the rear end of cab 18 relative to chassis 12 occurs. For example, FIG. 6 shows a condition where the chassis is higher at the lengthwise position of the front pivot axis 19 than at the location of the rear mounting 17, as when the rear of the chassis drops away from the cab. As shown, the relative downward movement of the rear of the chassis causes the lever 40 to be swung upwardly about its pivot axis as provided by pin 42.

Figure 7:
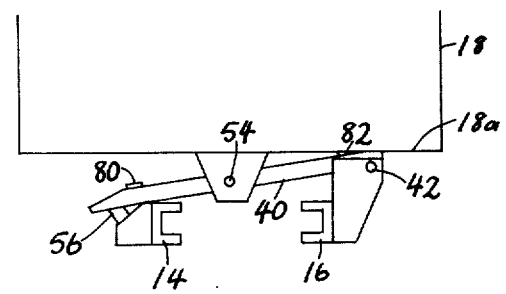

Similarly, in FIG. 7, the lever 40 is shown at a position corresponding to that at which the chassis is lower at the location of the axis 19 than at the location of rear mounting 17, as when the rear of the chassis rises toward the cab. Here, the end of lever 40 opposite pin 42 is swung downwardly.

Thus, in use of the vehicle 10, as the chassis undergoes undulating up and down movement in accordance with road conditions the unit 56 operates to tend to limit and dampen corresponding movements of the cab which would otherwise occur.

Figure 8:
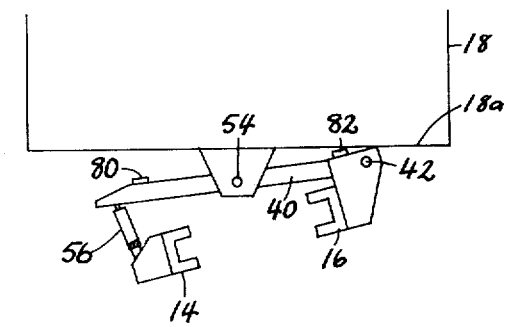

It will be appreciated that the described arrangement provides a three-point mounting between the cab and chassis. This is particularly convenient in that any twisting of the chassis which may occur about a front to rear axis as occurs particularly when the vehicle travels over rough ground will not be transmitted to cause corresponding tilting of the cab unless this twisting is sufficient to also cause twisting of the front end of the chassis (FIG. 8).

Lever 40 also limits side to side movement of the cab relative to the chassis.

Lever 40 carries resilient pads 80, 82 at each opposite end thereof, that is to say at each lateral side of the vehicle. These are arranged so as to engage the underside of the cab at extremes of movement of the cab relative to the lever. For example, in FIG. 6, the lever 40 is shown in an extreme pivotal position at which pad 80 engages the underside of the cab and in FIG. 7 at another extreme of its movement at which pad 82 engages the underside of a cab.

The described arrangement has been found to be particularly convenient also in that any movement of the rear of the cab in the vertical direction will cause a correspondingly amplified movement of the end of the lever at the point of connection to the unit 56. For example, in the shown construction where the distance of the pin 42 from the pivotal interconnection provided by pin 54 to the cab is roughly the same as the distance from the pin 54 to the point at which unit 56 is connected, a unit of movement of the cab in the vertical direction will result in two units of movement of the end of the lever to which the unit 56 is connected. In this way, the effective spring rate provided by the unit 56 is amplified in proportion to the movement amplification. This will result in improved damping characteristics.

The arrangement of the invention may be readily adapted to automatic levelling control of the cab. For example, this may be accomplished in a manner known, per se, by providing a valve sensitive to levelness of the cab of either exhaust air from the air bag in unit 56 or admit air thereinto from the usual compressed air reservoir provided on the vehicle to move the rear end of the cab up or down in a fashion which automatically restores levelness of the cab.

Mounting 17 also includes a flexible cable (not shown) capable of limiting the maximum amount of upward vertical travel which can occur in the cab away from the chassis. The cable is affixed to the chassis and to the cab and is arranged so as to be normally in a slack condition, but to be in a taut condition where excessive upward movement of the rear end of the cab occurs.

Whilst, in the described arrangement, lever 40 is to the rear of cab 18 and mountings 13, 15 are to the front of the cab, it would be possible to reverse the positions and place lever 40 at the front of the cab and the mountings 13, 15 at the rear. Again, the positioning of lever 40 may be varied. It is not essential that the lever extend in the side to side direction; it could, for example, extend in the lengthwise direction of the vehicle.

Again, although one end of the lever is in the described construction connected to the chassis 12, such end could be connected to the cab, with unit 56 acting between the cab and the other end of the lever. Unit 56 may also be replaced by other forms of spring such as a helical spring and may be in the form of a tension spring rather than a compression spring, the spring acting in such case between the lever and that one of the chassis and cab to which the other end of the lever is not coupled. Various commercially available types are suitable for use as unit 56. For example, one such suitable type is the air-adjustable "Ride Leveler" shock absorbers manufactured by Monroe-Wylie Shock Absorbers.

The described arrangement has been advanced merely by way of explanation and many modifications may be made thereto without department from the spirit and scope of the invention which includes every novel feature and combination of novel features herein disclosed.

I claim:

1. A cab suspension for a vehicle having a chassis supporting a cab, said cab being supported on the chassis at first, second and third spaced-apart locations, said first and second locations being generally aligned in the side-to-side direction of the vehicle and spaced apart in the side-to-side direction, and said third location being spaced away from said first and second locations in the lengthwise direction of the vehicle; the cab being mounted to the chassis at said first and second locations by means permitting movement of the cab relative to the chassis, but confining such movement at least substantially to movement about a side-to-side extending axis adjacent said first and second locations; the cab being mounted to the chassis at said third location for vertical movement relative to the chassis by a lever pivotally coupled to one of said cab or chassis at a first position along said lever, pivotally coupled to an opposite one of said cab or chassis at a second position along said lever spaced apart from said first position, and coupled to said cab or chassis at a third position along said lever by resilient means, said resilient means acting between said cab or chassis and said lever and applying through said lever a resilient force directed against the weight of said cab, the cab being thereby allowed to oscillate substantially vertically about said side-to-side axis while being resiliently supported by said lever without any significant side-to-side movement of the cab relative to the chassis at said third location.

2. The vehicle cab suspension of claim 1, wherein said resilient means interconnects said lever and said chassis, said lever being coupled to the cab at said second position, whilst the chassis is coupled to said lever at said first position, said second position being between said first and third position.

3. The vehicle cab suspension of claim 2, wherein said resilient means includes a compression spring.

4. The vehicle cab suspension of claim 1, wherein said resilient means includes dampening means for dampening relative movement between said lever and said cab or chassis.

5. The vehicle cab suspension of claim 4, wherein said dampening means includes a dampening cylinder.

6. The vehicle cab suspension of claim 1, wherein said resilient means includes a gas chamber, with the pressure of gas within said chamber being selectively variable to adjust the length of said resilient means under a given load.

7. The vehicle cab suspension of claim 1, further including sensor means for sensing the movement of the cab relative to a predetermined level above the chassis, and wherein said resilient means includes means for automatic adjustment of the length of said resilient means in response to said sensor means to return the cab to said predetermined level.

8. The vehicle cab suspension of claim 1, wherein said lever extends generally transversely of the chassis, with the axes of pivotal movement between said lever and said cab and chassis at said first and second positions being arranged to extend generally lengthwise of the vehicle.

9. A cab suspension for a wheeled vehicle comprising a chassis, a cab on said chassis, pivot means at a first location for pivotally supporting one end of said cab on said chassis for movement relative to said chassis, and support means for supporting the other end of said cab at a second location spaced from said first location permitting vertical movement of said cab relative to said chassis, said support means including an elongated member coupled to one of said cab or chassis for relative rotational movement thereto at a first position along said member, coupled to an opposite one of said cab or chassis for relative rotational movement thereto at a second position along said member spaced from said first position, and coupled to said cab or chassis at a third position along said member by damping means for dampening vertical movement of said member relative to said cab or chassis, said cab thereby being allowed to oscillate substantially vertically in damped movement about said pivotally supported end.

10. The suspension of claim 3, wherein said member is pivotally coupled at an end portion to said chassis and at an intermediate portion to said cab, and said dampening means includes a dampening cylinder coupling another end portion of said member to said chassis.

11. The suspension of claim 3, said support means including a gas spring adjustable in length for adjusting to a preselected distance the height of said other end of said cab above said chassis.

12. The vehicle cab suspension of claim 9, wherein said support means further includes resilient means acting between said member and said cab or chassis for applying a resilient force directed against the weight of said cab.

13. A cab suspension for a vehicle having a chassis supporting a cab, said cab being supported on said chassis at first, second and third spaced-apart locations, said first and second locations being generally aligned in the side-to-side direction of the vehicle and spaced apart in the side-to-side direction, and said third location being spaced away from the first and second locations in the lengthwise direction of the vehicle; said cab being mounted to said chassis at said first and second locations by means permitting movement of said cab relative to said chassis, but confining such movement at least substantially to movement about a side-to-side extending axis adjacent said first and second locations; said cab being mounted to said chassis at said third location for vertical movement relative to said chassis by a lever having a first end portion, a second end portion and an intermediate portion therebetween, said first end portion being pivotally connected to one of said cab or said chassis and said intermediate portion being pivotally connected to an opposite one of said cab or said chassis for movement of said lever in a substantially vertical plane, and said second end portion being connected to the same one of said cab or said chassis as said first end portion by a resilient member for applying through said lever a dampened resilient force directed against the weight of said cab, said cab being thereby allowed to oscillate substantially vertically about said side-to-side axis while being resiliently supported by said lever without any significant side-to-side movement of said cab relative to said chassis at said third location.

14. The vehicle cab suspension of claim 13, wherein said resilient member is a spring.

15. The vehicle cab suspension of claim 13, wherein said resilient member includes a dampening cylinder.

16. The vehicle cab suspension of claim 13, wherein said resilient member is selectively adjustable in length to preselect the distance of said cab above said chassis.

17. The vehicle cab suspension of claim 16, wherein said resilient member includes a gas chamber, with the pressure therein being selectively variable.

18. The vehicle cab suspension of claim 16, wherein said resilient member includes a gas spring.

19. The vehicle cab suspension of claim 13, wherein said lever extends generally transversely of said chassis.

20. The vehicle cab suspension of claim 13, wherein said first end portion is connected to said chassis, said intermediate portion is connected to said cab, and said second end is connected to said chassis by said resilient member.

21. The vehicle cab suspension of claim 20, wherein said resilient member is a compression spring.

22. The vehicle cab suspension of claim 20, wherein the length of said lever from the point of connection to said chassis at said first end portion to the point of connection to said chassis at said second end portion is sufficiently greater than the length from the point of connection to said chassis at said first end portion to the point of connection to said cab at said intermediate portion to amplify the travel of said resilient member relative to said cab.

23. The vehicle cab suspension of claim 1 wherein said third position along said lever is spaced apart from said first and second positions.

* * * * *